United States Patent
Kimura (10) Patent No.: US 7,644,292 B2
(45) Date of Patent: Jan. 5, 2010

(54) INFORMATION PROCESSING APPARATUS, QUICK ACTIVATION METHOD, AND STORAGE MEDIUM

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 11/237,822

(22) Filed: Sep. 29, 2005

(65) Prior Publication Data

US 2006/0212736 A1 Sep. 21, 2006

(30) Foreign Application Priority Data

Mar. 18, 2005 (JP) ............................. 2005-079241

(51) Int. Cl.
*G06F 1/00* (2006.01)
*G06F 11/00* (2006.01)
*G06F 9/455* (2006.01)

(52) U.S. Cl. ............................. 713/323; 714/15; 718/1

(58) Field of Classification Search ................. 713/323, 713/310

See application file for complete search history.

(56) References Cited

U.S. PATENT DOCUMENTS

| 5,944,828 | A | 8/1999 | Matsuoka | |
|---|---|---|---|---|
| 5,978,922 | A | 11/1999 | Arai et al. | |
| 2004/0205203 | A1* | 10/2004 | Peinado et al. | 709/229 |
| 2005/0108585 | A1* | 5/2005 | Yang | 713/310 |
| 2006/0064688 | A1* | 3/2006 | Tseng | 718/1 |

FOREIGN PATENT DOCUMENTS

| JP | 9-237128 | 9/1997 |
|---|---|---|
| JP | 10-97353 | 4/1998 |
| JP | 2002-99502 | 4/2002 |
| JP | 2004-152304 | 5/2004 |

OTHER PUBLICATIONS

Office Action issued in corresponding Chinese Patent Application No. 200510085360.7, on Dec. 7, 2007.
"To follow Linux 7.0 as it is", Hejeon Publishing Company, Apr. 25, 2001, pg. 421.
"Functions Characteristic to Windows XP Professional", Microsoft Corp., Retrieved from URL: http://www.microsoft.com/korea/windowsxp/pro/evaluation/features.asp [Retrieved on Sep. 29, 2006].
Tehan Kim, "Fast more than 10 times if 'Maximum Power-Saving mode' is used", Toa Daily, Nov. 28, 2001.
Korean Patent Office Action, mailed Sep. 29, 2006, and issued in corresponding Korean Patent Application No. 10-2005-0069574.

* cited by examiner

*Primary Examiner*—Suresh K Suryawanshi
(74) *Attorney, Agent, or Firm*—Staas & Halsey (57) ABSTRACT

In response to an instruction to shut down a first operating system, the first operating system is shut down, and then a second operating system whose function is limited as compared with the first operating system is activated, and by the activation, the data stored in the memory is saved and a power-saving state is immediately entered, thereby automatically allowing the second operating system to be transferred to a state in which quick activation can be performed.

9 Claims, 11 Drawing Sheets

| ITEM | FIRST OS Home | SECOND OS | IMM | Operation | TRANSITION OF OPERATION | EXPECTED VALUE |
|---|---|---|---|---|---|---|
| 1 | NOT OPENED | NOT OPENED | NOT TO BE USED | POWER OFF | FIRST OS → (S5) → PWROFF | |
| | | | | Reboot | FIRST OS → (Reboot) → POST → FIRST OS | |
| | | | | NECESSARILY POWER OFF AFTER EXECUTION | FIRST OS → (S5) → FBCall → (S5) → POST*1 → SECOND OS → (S5) → POST*1 → SECOND OS → (S4) → POST → FIRST OS | |
| | | | TO BE USED | POWER OFF | FIRST OS → (S5) → POST*1 → SECOND OS → (S5) → POST*1 → SECOND OS → (S4) → POST → FIRST OS | POST*1 → SECOND OS → (S3) |
| | | | | Reboot | FIRST OS → (Reboot) → POST → FIRST OS | |
| | | | | NECESSARILY POWER OFF AFTER EXECUTION | FIRST OS → (S5) → FBCall → (S5) → POST*1 → SECOND OS → (S5) → POST*1 → SECOND OS → (S4) → POST → FIRST OS | |
| 2 | OPENED | NOT OPENED | NOT TO BE USED | POWER OFF | FIRST OS → (S5) → PWROFF | |
| | | | | Reboot | FIRST OS → (Reboot) → POST → FIRST OS | |
| | | | | NECESSARILY POWER OFF AFTER EXECUTION | – | |
| | | | TO BE USED | POWER OFF | FIRST OS → (S5) → POST*1 → SECOND OS → (S5) → POST*1 → SECOND OS → (S4) → POST → FIRST OS ※3 | POST*1 → SECOND OS → (S3) |
| | | | | Reboot | FIRST OS → (Reboot) → POST → FIRST OS | |
| | | | | NECESSARILY POWER OFF AFTER EXECUTION | – | |
| 3 | OPENED | OPENED | NOT TO BE USED | POWER OFF | FIRST OS → (S5) → PWROFF | |
| | | | | Reboot | FIRST OS → (Reboot) → POST → FIRST OS | |
| | | | | NECESSARILY POWER OFF AFTER EXECUTION | – | |
| | | | TO BE USED | POWER OFF | FIRST OS → (S5) → POST*1 → SECOND OS → (S3) | |
| | | | | Reboot | FIRST OS → (Reboot) → POST → FIRST OS | |
| | | | | NECESSARILY POWER OFF AFTER EXECUTION | – | |

| BY WAY OF | STATE TRANSITION | TRANSITION OF OPERATION | | |
|---|---|---|---|---|
| OP4 | S0 ⟶ Standby (S1/S3) | FIRST OS ⟶ Standby (S1/S3) | <RESTORATION EVENT> | Standby (S1/S3) ⟶ FIRST OS |
| OP5 | S0 ⟶ Hibernate (S4) | FIRST OS ⟶ Hibernate (S4) | <RESTORATION EVENT> | Hibernate (S4) ⟶ POST ⟶ FIRST OS |
| OP7 | S0 ⟶ Shutdown (S5) | FIRST OS ⟶ Shutdown (S5) | <RESTORATION EVENT> | Shutdown (S5) ⟶ POST ⟶ FIRST OS |
| SA1 | S0 ⟶ Shutdown (S5) | FIRST OS ⟶ FBE call ⟶ Shutdown (S5) | <RESTORATION EVENT> | Shutdown (S5) ⟶ POST ⟶ FIRST OS |
| OP6 | S0 ⟶ Reboot | FIRST OS ⟶ Reboot ⟶ POST ⟶ FIRST OS | | |
| SE1~OP3 | AC Loss ⟶ POWER ON | AC On ⟶ POST ⟶ Shutdown (S5) | <POWER ON> | Shutdown (S5) ⟶ POST ⟶ FIRST OS |

| BY WAY OF | STATE TRANSITION | TRANSITION OF OPERATION |
|---|---|---|
| OP4 | S0 ←→ Standby (S1/S3) | FIRST OS → Standby (S1/S3)  <RESTORATION EVENT>  Standby (S1/S3) → FIRST OS |
| OP5 | S0 ←→ Hibernate (S4) | FIRST OS → Hibernate (S4)  <RESTORATION EVENT>  Hibernate (S4) → POST → FIRST OS |
| SB11 | S0 ←→ Shutdown (S5) | FIRST OS → Shutdown (S5) → QTV-POST(BIOS) → SECOND OS → SECOND OS-S3 |
| SB10 | S0 ←→ Shutdown (S5) | FIRST OS → FBE call → Shutdown (S5) → QTV-POST(BIOS) → SECOND OS → SECOND OS-S3 |
| OP6 | S0 ←→ Reboot | FIRST OS → Reboot → POST → FIRST OS |
| SE1~OP3 | AC Loss → POWER ON | AC On → S0 → Shutdown (S5)  <POWER ON>  Shutdown (S5) → POST → FIRST OS |
| SB18 | SECOND OS-S3 → REMOTE OPERATION | SECOND OS-S3 → SECOND OS |
| | SECOND OS-S3 → POWER BUTTON | SECOND OS-S3 → Reboot → POST → FIRST OS |
| SB20 | SECOND OS-S3 → TIMER | SECOND OS-S3 → Reboot → POST → FIRST OS |
| | SECOND OS-S3 → LAN | SECOND OS-S3 → Reboot → POST → FIRST OS |

F I G. 1 0 B

INFORMATION PROCESSING APPARATUS, QUICK ACTIVATION METHOD, AND STORAGE MEDIUM

BACKGROUND OF THE INVENTION

1. Field of the Invention

The present invention relates to the information processing apparatus loaded with the first operating system and the second operating system whose function is limited as compared with the first operating system, and the technology of quickly activating the second operating system.

2. Description of the Related Art

An information processing apparatus represented by a personal computer (hereinafter referred to as PC) has been provided with an increasing number of functions, and an increasing number of products have recently been loaded with AV facilities for processing both video and audio. Most of the information processing apparatuses loaded with AV facilities can be used as AV domestic electric appliances such as television (TV) receivers, recorders, players, etc.

The AV facilities can be loaded into exclusive hardware capable of performing all necessary processes for realizing the facilities. However, such hardware requires a very high cost. Therefore, most of the information processing apparatuses implement the AV facilities by preparing hardware for performing a specific process and application software (hereinafter referred to simply as an application) for performing other processes partly to reduce a production cost.

An information processing apparatus normally operates by activating basic software called operating system (hereinafter referred to as "OS"). Thus, a normal application is generated based on the operation using an OS including those for AV facilities. The software (program) executed by the information processing apparatus is normally stored in a non-volatile storage device, for example, a hard disk device.

The software stored in a storage device is read to memory and activated. The activation requires some time, and the larger the software, the longer the necessary time. Since a recent OS is provided with many functions, it takes a relatively long time. Therefore, an information processing apparatus which has not activated an OS takes a long time to be able to utilize AV facilities.

To shorten the required time, the functions to be loaded can be restricted. In the present example, just for convenience, the OS for which loaded functions are restricted is called an "instant OS" or a "second OS", and a normal OS is called a "general-purpose OS" or a "first OS".

The above-mentioned instant OS is normally read to memory and activated by the occurrence of a specific activation event in a power disconnection (S5) state or in an inactive (S4) state. The activation event occurs by an operation on a predetermined switch provided, for example, on a remote control device (hereinafter referred to as an "RC").

Figure 1A:
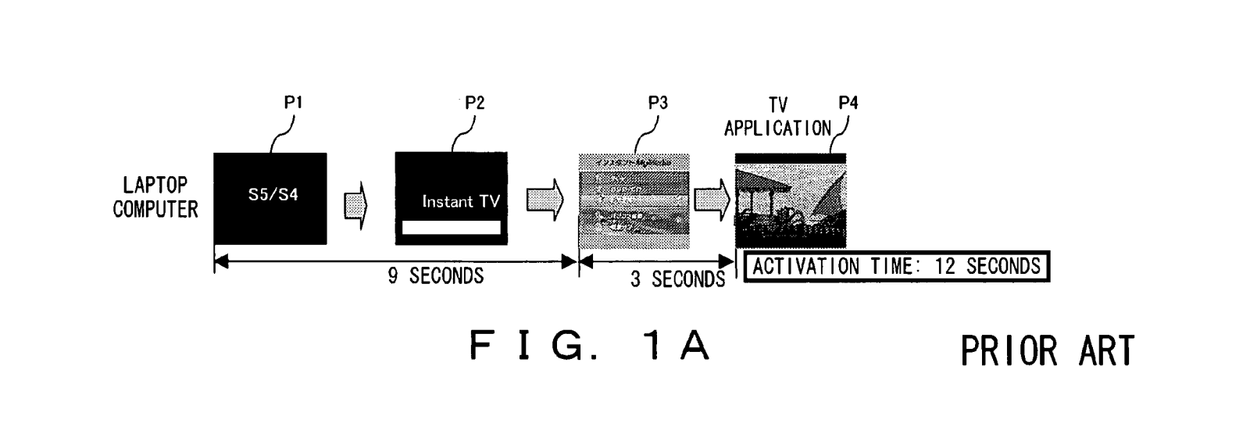
FIG. 1A is an explanatory view of the time required from the activation of an instant OS to the transfer to the state in which AV facilities can be used using a conventional information processing apparatus (notebook type)
Figure 1B:
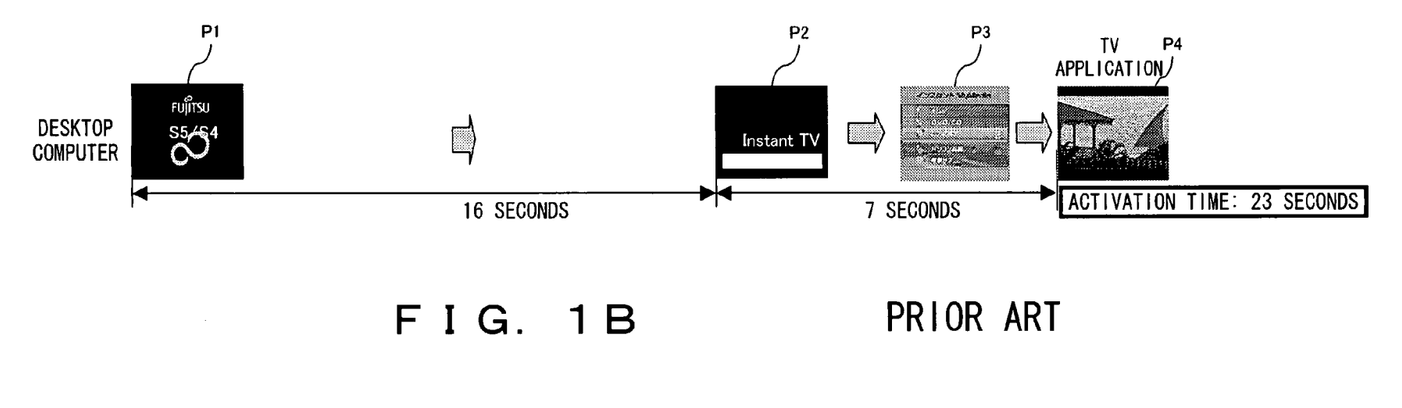
FIG. 1B is an explanatory view of the time required from the activation of an instant OS to the transfer to the state in which AV facilities can be used using a conventional information processing apparatus (desktop type)

FIGS. 1A and 1B are explanatory views showing the necessary time for transfer from the activation of the instant OS to the state in which the AV facilities can work. The state in which the AV facilities can work is, for example, a state in which a TV broadcast can be given. FIG. 1A shows a case in which a notebook PC is used. FIG. 1B shows a case in which a desktop PC is used.

As shown in FIG. 1A, if a specific activation event occurs in the power disconnection (S5) state or in the inactive (S4) state, the information processing apparatus (PC) first displays the screen P1 for notification of activation. Afterwards, the screen P2 for notification of a read of an instant OS, and its menu display screen P3 are displayed. The screen P4 for receiving a TV broadcast can be displayed by selecting the reception of a TV broadcast on the menu display screen P3. As shown in FIG. 1B, this holds true with the desktop information processing apparatus (PC).

A notebook information processing apparatus takes about 12 seconds to transfer from the power disconnection (S5) state to the state in which a TV broadcast can be received. In the meantime, a desktop information processing apparatus takes about 23 seconds to transfer to the desired state. The activation time required to transfer to the state is longer for a desktop information processing apparatus. However, as compared with the case in which a general-purpose OS is activated, the activation time is considerably shorter. The activation time of the desktop information processing apparatus is longer because a hard disk device larger than the hard disk device of the notebook information processing apparatus, that is, because a hard disk device requiring a longer activation time, is loaded.

By activating an instant OS, the AV facilities can be more quickly used. However, AV domestic electric appliances can be normally used immediately after power is applied. Thus, if the information processing apparatus is to be used as an AV domestic electric appliance, then the AV facilities have to be further improved for quick start.

A facility for quicker start can be a resume (power saving control) function (Japanese Published Patent Application No. Hei 10-97353, Japanese Published Patent Application No. Hei 9-237128, Japanese Published Patent Application No. 2004-152304, and Japanese Published Patent Application No. 2002-99502). The resume function is to store data in memory and transfer the data to a power saving state, thereby enabling the data to recover to the originally activated state. The resume function can be a "hibernation" function of copying data in memory to a hard disk device, a "suspend" function of storing the data in memory in a power saving mode. The suspend function is also referred to as a "standby" function.

If the state in which an instant OS is activated is transferred by the resume function to the standby state or the hibernation state, and returned to the original state, then the AV facilities can be more quickly used. However, unlike the general-purpose OS, the conventional instant OS is not loaded with the function of using the resume function. Therefore, a transfer to a hibernation state and a standby state has been performed on the condition set in the BIOS.

In the transfer performed on the condition set in the BIOS, a user cannot immediately transfer the state with desired timing. When an instant OS is loaded with a function of using the resume function, a user can use the resume function with desired timing but with the instant OS activated.

It is not necessary for a user that has activated a general-purpose OS to activate an instant OS, and it is difficult to correctly predict in advance the next OS to be activated. With these conditions taken into account, it is necessary to protect a user against a troublesome operation of newly activating an instant OS only as an operation which may not be necessary. However, since a user cannot predict when an instant OS is to be activated, it is necessary to maintain the state of quickly activating the OS.

SUMMARY OF THE INVENTION

The present invention aims at providing the technology of constantly and quickly activating an instant OS without assigning a troublesome operation to a user.

The information processing apparatus according to the present invention is based on reading a program to be executed to memory, and includes: a non-volatile memory storage unit storing as a program a first operating system, and a second operating system whose function is limited as compared with the first operating system; a system activation unit for shutting down the first operating system in response to an instruction to shut down the first operating system being read to memory and executed, and then reading the second operating system to the memory for activation; and a power-saving control unit for storing the data in the memory and immediately transferring the data to a power-saving state after the system activation unit activates the second operating system.

It is preferable that the system activation unit restores the data in the memory to the state of the data before the data is stored only when a predetermined event occurs in a power-saving state entered by the power-saving control unit.

It is preferable that the power-saving control unit stores the data in the memory and transfer the data to the power-saving state in response to a hibernation or standby instruction. It is also preferable to transfer the data in the memory to the power-saving state with the data stored in the memory.

It is preferable that, when power can be supplied from an external power source and a battery, the power-saving control unit selects storage of the data in the memory from between the memory and a storage device depending on the presence/absence of the supply of power from the external power source, and transfers the data to the power-saving state depending on a selection result. In this case, it is preferable that the power-saving control unit selects storage of the data in the memory from between the memory and the storage device depending on the presence/absence of the supply of the power from the external power source the remainder of the battery, and transfers the data to the power-saving state depending on the selection result.

The quick activation method according to the present invention is a method for allowing an information processing apparatus, in which a non-volatile storage device stores a first operating system and a second operating system whose function is limited as compared with the first operating system, to quickly activate the second operating system. In response to an instruction to shut down the first operating system, the first operating system is shut down, and then the second operating system is activated. By the activation, the data stored in the memory is saved and immediately transferred to the power-saving state, or is transferred to the power-saving state with the data stored in the memory.

The record medium according to the present invention can be accessed by the information processing apparatus, in which anon-volatile storage device stores a first operating system and a second operating system whose function is limited as compared with the first operating system. The record medium has the function of, in response to an instruction to shut down the first operating system, shutting down the first operating system, and then activating the second operating system, and has the function of, by activating the second operating system, holding the data stored in the memory and immediately transferring it to the power-saving state.

According to the present invention, in response to an instruction to shut down the first operating system and after the shutdown of the first operating system, the second operating system whose function is limited as compared with the first operating system is activated, and by the activation the data stored in the memory is held and immediately transferred to the power-saving state. Since the data in the memory can be held and automatically transferred to the power-saving state, the second operating system can be quickly activated. Since the data can be automatically transferred, a troublesome operation for a user can be avoided.

If the data in the memory is to be restored to the state before the storage in the memory only when a predetermined event occurs with data automatically transferred to the power-saving state, then a process can be appropriately performed when the first operating system is activated without any troublesome operation to be performed by the user. When data in the memory is held and automatically transferred to the power-saving state in response to a standby instruction to the second operating system, the second operating system can be constantly and quickly activated.

DESCRIPTION OF THE PREFERRED EMBODIMENTS

The embodiments of the present invention are described below by referring to the attached drawings.

Figure 2:
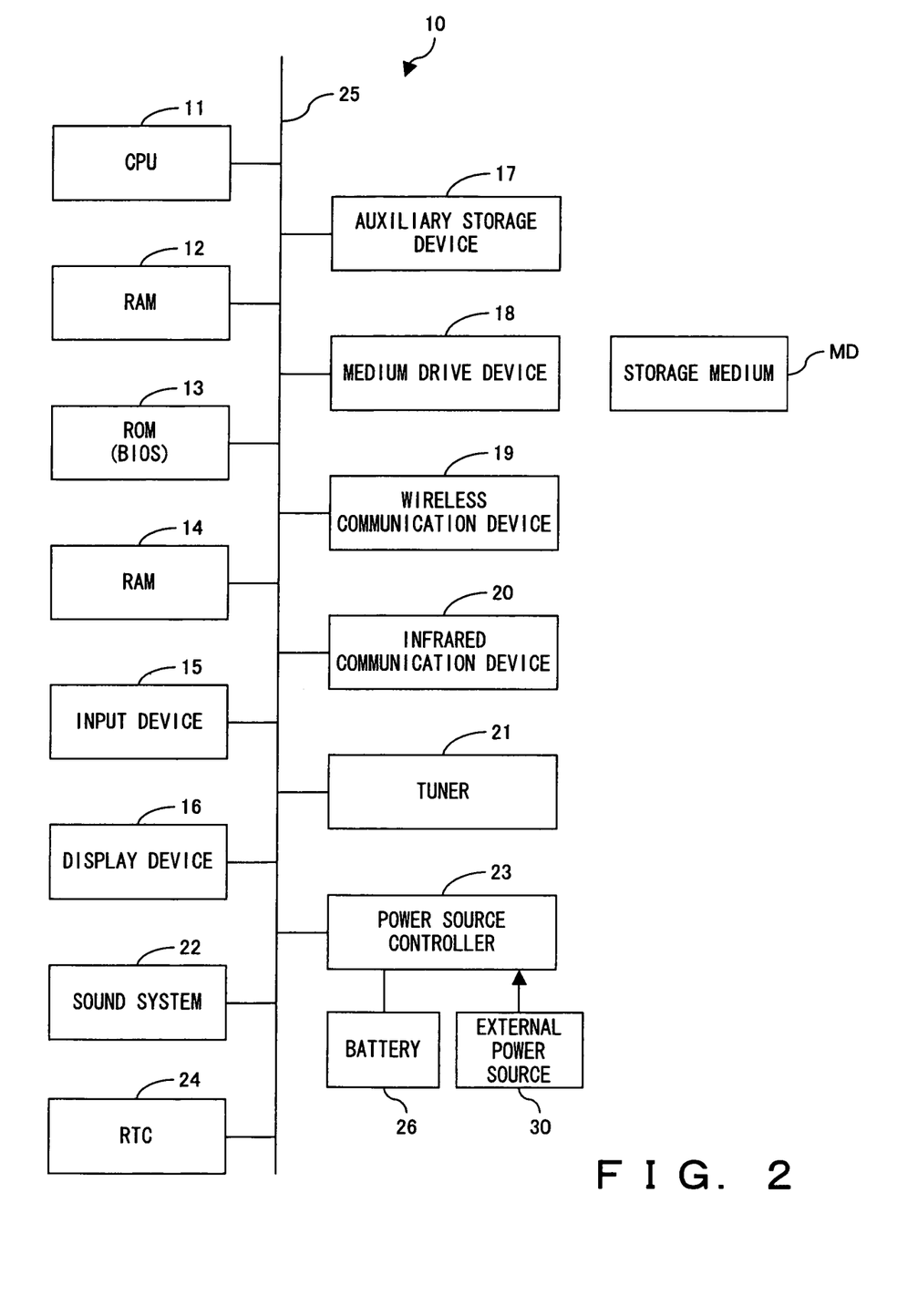
FIG. 2 is an explanatory view of the configuration of the information processing apparatus according to an embodiment of the present invention.
Figure 3:
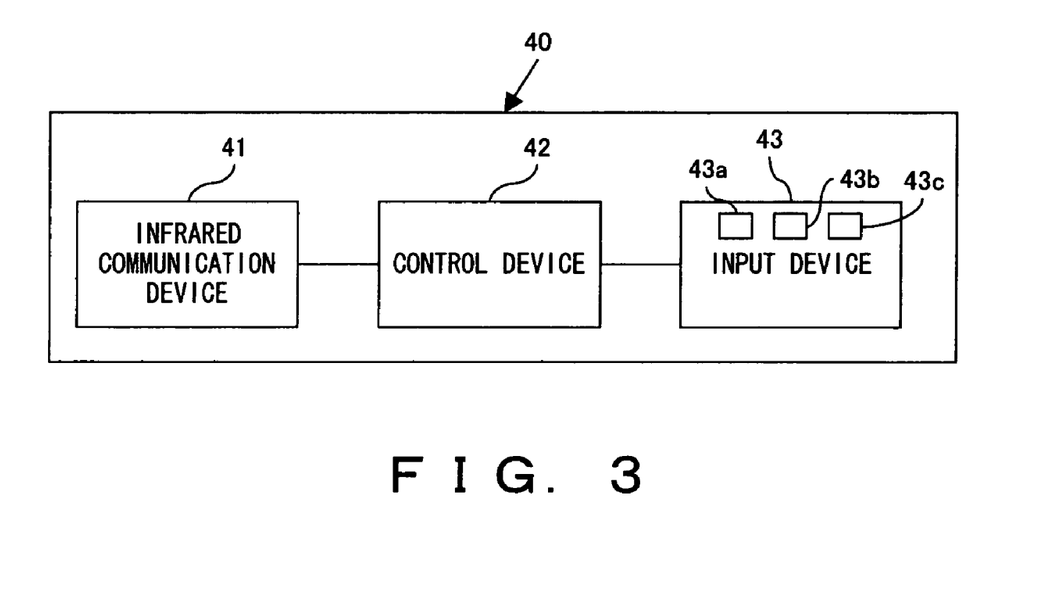
FIG. 3 is an explanatory view of the configuration of the remote control device for the information processing apparatus according to an embodiment of the present invention.

FIG. 2 is an explanatory view of the configuration of the information processing apparatus according to an embodiment of the present invention. FIG. 3 is an explanatory view of the configuration of the remote control device (hereinafter referred to as "RC") for the information processing apparatus.

An information processing apparatus 10 according to the present embodiment is configured by, as shown in FIG. 2, a CPU 11 for controlling the entire 10, RAM 12 used by the CPU 11 for work, ROM 13 storing a BIOS (basic input/output system), RAM 14 used for storage of setting contents for the BIOS, an input device 15 connected to input equipment such as a keyboard, a mouse, etc. or containing them, a display device 16 having, for example, an LCD, its controller, and VRAM, an auxiliary storage device 17 which is, for example, a hard disk device, a medium drive device 18 accessible to an optical disk (in this example, including a CD, CD-ROM, CD-R, DVD, etc.), or a portable record medium MD such as a magnetic disk, etc., a wireless communication device 19 for performing communications with an external device by wireless, an infrared communication device 20 for performing communications with an RC 40 using infrared, a tuner 21 for extracting a broadcast signal of a specified channel from received broadcast signals, encoding and outputting it, a sound system 22 for outputting audio, a power source controller 23 for supplying electric power from an external power source 30, and a real time clock (RTC) 24 connected via a bus 25.

The RAM 14 is used as non-volatile memory by a battery not shown in the attached drawings. The sound system 22 converts input audio data to an analog audio signal, amplifies the signal, and output the resultant signal through a speaker or a terminal. The tuner 21 inputs a broadcast signal received by a built-in antenna of a headphone connected to the terminal, or an external connected to an antenna input terminal (not shown in the attached drawings), extracts a broadcast signal of a channel to be extracted and demodulates the signal, encodes the signal, and then outputs digital image data and audio data. Storing a broadcast signal, that is, recording an image of a broadcast program, is performed by the CPU 11 encoding the data and storing the encoded data in the auxiliary storage device 17.

The auxiliary storage device 17 stores an OS corresponding to various applications, and another OS whose function is restricted as compared with the former OS. Similarly, in this example, the former OS is called a "general-purpose OS" or a "first OS", and the latter is called a "instant OS" or "second operating system". The application for AV facilities operating with the instant OS is also stored in the auxiliary storage device 17. The name of the application is "instant MyMedia". The instant MyMedia is loaded with the functions of receiving a TV broadcast, regenerating medium MD, etc. The medium MD can be hereinafter DVD.

The RC 40 remotely operates the information processing apparatus 10. As shown in FIG. 3, it is configured by an infrared communication device 41 for communicating with the information processing apparatus 10 using infrared, a control device 42 for controlling the entire RC 40, and an input device 43 having various buttons. The various buttons includes a MyMedia button 43a for indicating the activation of instant MyMedia, a TV button 43b for indicating the activation of instant MyMedia in a state in which a TV broadcast can be received, and a DVD button 43c for indicating the activation of instant MyMedia in a state in which a medium MD can be regenerated.

The control device 42 designates a button operated by a user by monitoring the state changes of various buttons of the input device 43, and transmits a signal corresponding to the designated button from the infrared communication device 41. Thus, the operation performed by the user for the RC 40 is transmitted to the information processing apparatus 10.

The power source controller 23 of the information processing apparatus 10 constantly supplies power to the infrared communication device 20 for reception of a signal transmitted from the infrared communication device 41 of the RC 40. Thus, upon reception of a signal by the infrared communication device 20 transmitted by the operation on the buttons 43a through 43c, or by the press of a power button not shown in the attached drawings, the supply of power to other components is started. By starting the supply of power, the CPU 11 reads the BIOS stored in the ROM 13, reads the OS to be selected depending on the type of activation event from the auxiliary storage device 17 to the RAM 12, and is then activated.

A restoration event from the standby state in which data stored in the RAM 12 is saved by supplying power to the RAM, or the hibernation state in which the data is stored and saved to the original state is assumed to be, for convenience, an event generated by an operation on any of the buttons 43a through 43c provided for the RC 40, or an event generated by any of a press of a power button, reception of a signal by the infrared communication device 20, and the RTC 24. An activation event of newly activating a general-purpose OS or an instant OS is assumed to be the same as the restoration event. In the assumption, the same events are processed as an activation event or a restoration event depending on whether or not the data in the RAM 12 is stored.

In the standby state and the hibernation state, the power supplied from the power source controller 23 to each component is restricted. For example, the supply of power to the display device 16, the tuner 21, the auxiliary storage device 17, etc. is stopped, and the wireless communication device 19, etc. is operated in the power-saving mode. Thus, the state of saving power more than in a normal mode is entered.

Figure 4:
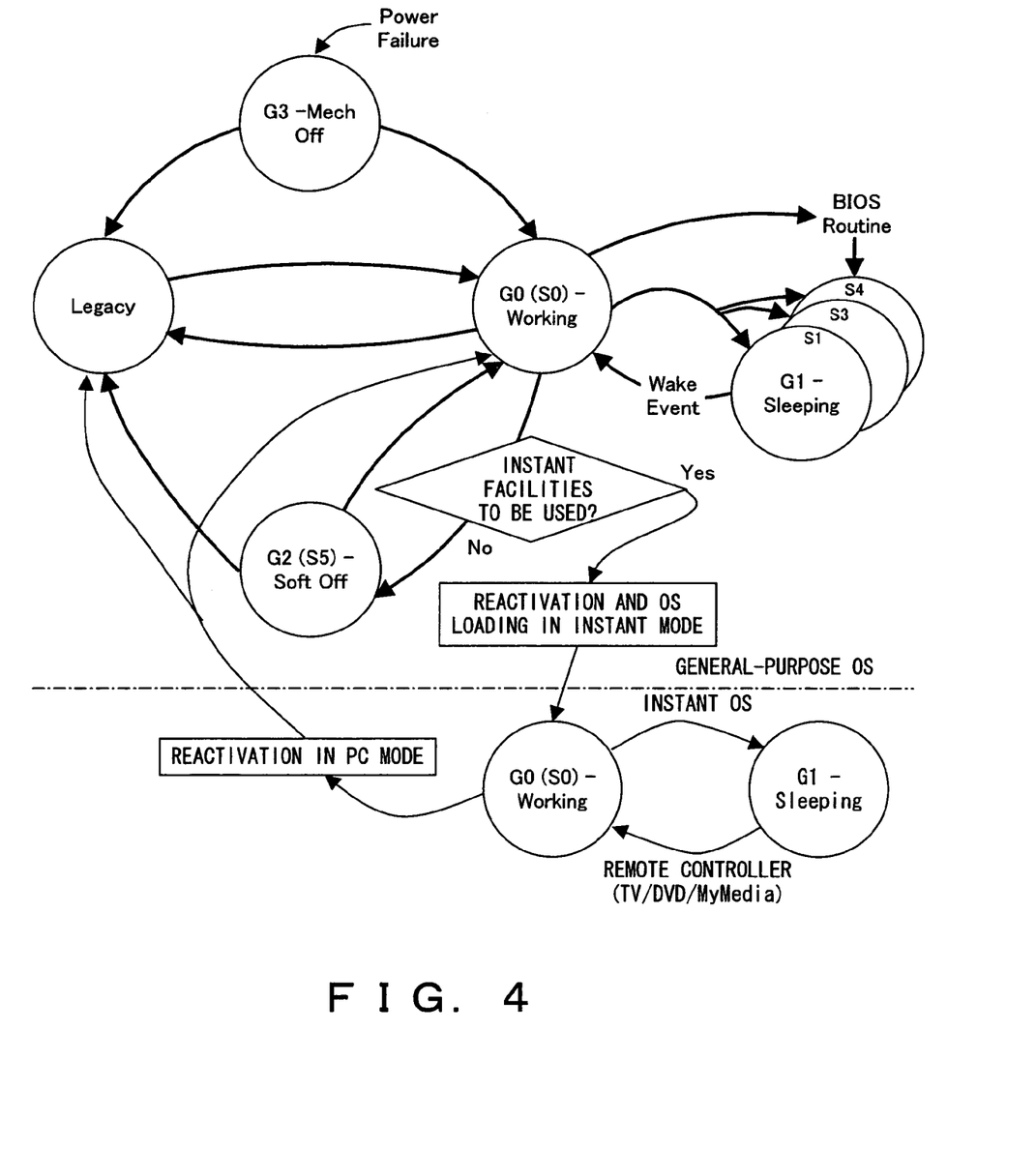
FIG. 4 is an explanatory view of the transition of the operation of an information processing apparatus 10 according to an embodiment of the present invention.

FIG. 4 is an explanatory view of the transition of an operation in the information processing apparatus 10. FIG. 4 shows the transition of an operation using the standard of the ACPI (Advanced Configuration and Power Interface).

According to the present embodiment, as shown in FIG. 4, when the power-on state (G0 (S0)) activating the general-purpose OS is transferred to the power-off state (G2 (S5)) by a shutdown instruction, it is determined whether or not using an instant OS is set. Thus, when it is determined that using an instant OS is set, the instant OS is activated and the power-on state (G0 (S0)) is automatically entered, and after the activation, the inactive state (G1) of the standby state (S3) is entered.

As described above, the instant OS (instant MyMedia) can be activated by an operation on any of the buttons 43a through 43c. Thus, the restoration from the inactive state (G1 (S3)) to the power-on state is performed as a restoration event by a notification of the operation of any button from the RC 40. When a power button is pressed, a signal from the infrared communication device 20 is received, or a restoration event occurs by the RTC 24, the general-purpose OS or the previous OS "Legacy" is activated after temporary restoration to the power-on state.

When the activation of the instant OS is desired by a user by transfer from the instant OS to the standby state, the standby state can be restored to the power-on state. Therefore, the instant OS can be activated very quickly from the occurrence of the restoration event by the user. As a result, the user can constantly and preferably use the 10 as an AV domestic electric appliance. Since data can be automatically transferred to the standby state of the instant OS by the shutdown of the general-purpose OS, the user can be free of troublesome operations, and the instant OS can be constantly and quickly activated.

According to the present embodiment, the standby state can be entered so that the restoration to the original state can be more quickly performed as compared with the hibernation state. Depending on the time required to restore to the original state, the hibernation state can be entered. A user can select the standby state or the hibernation state so that the user selected state can be entered.

Figure 5:
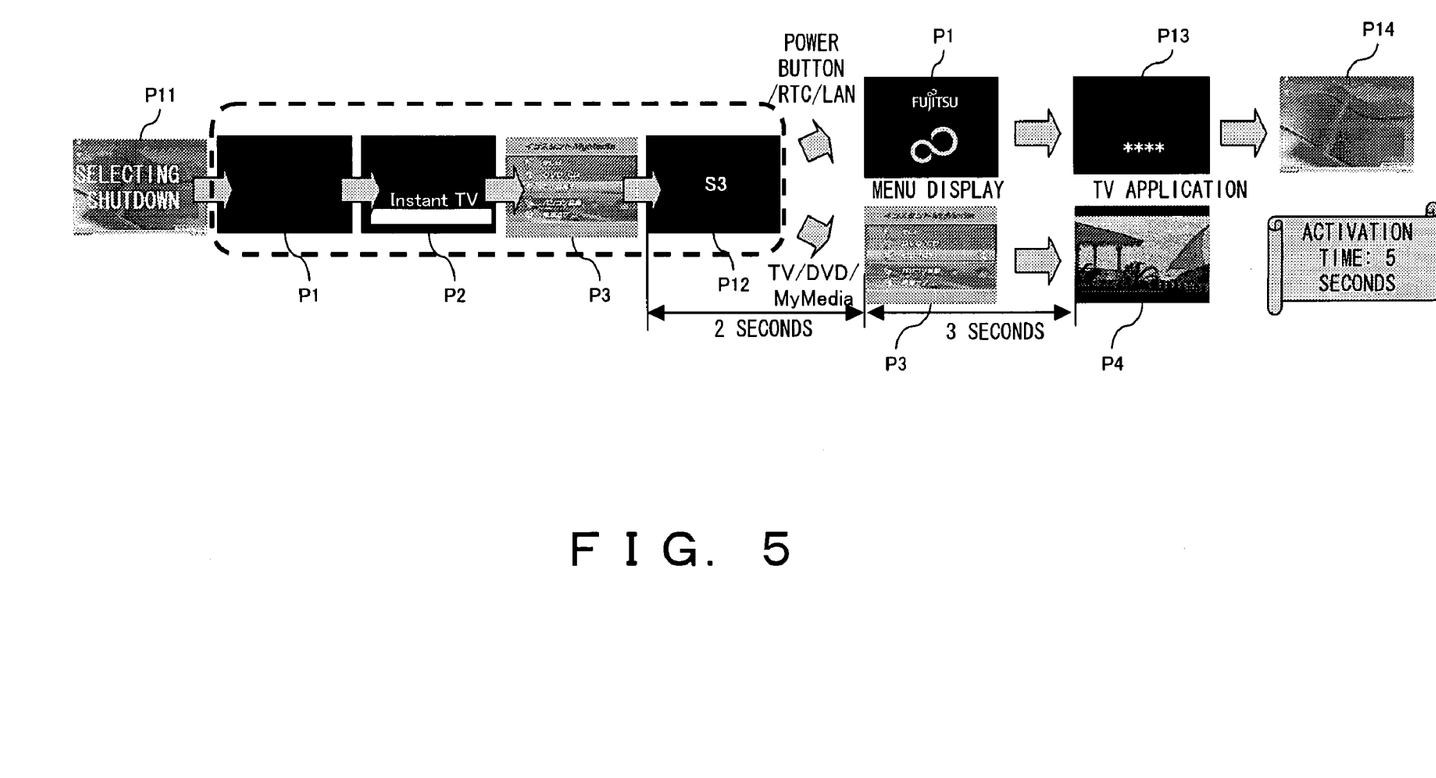
FIG. 5 is an explanatory view of the transition of the operation after exiting a general-purpose OS.

FIG. 5 is an explanatory view of the transition of the operation after exiting the general-purpose OS. The transition of the operation is represented by the transition of the screen displayed on the display device 16. P11 shown in FIG. 5 indicates the screen notifying that the shutdown of the general-purpose OS has been selected. P12 indicates the screen displayed when the instant OS is in the standby state. P13 indicates the screen notifying that the activation of the general-purpose OS is started. P14 indicates the screen displayed after the activation of the general-purpose OS. The same screen as FIG. 1A is assigned the same reference numerals.

As shown in FIG. 5, by setting the instant OS in a standby state, AV facilities can be used within a very short time. Since the original state is restored by determining whether or not the instant OS is to be restored to the original state, the activation of the general-purpose OS can be appropriately processed.

Figure 6:
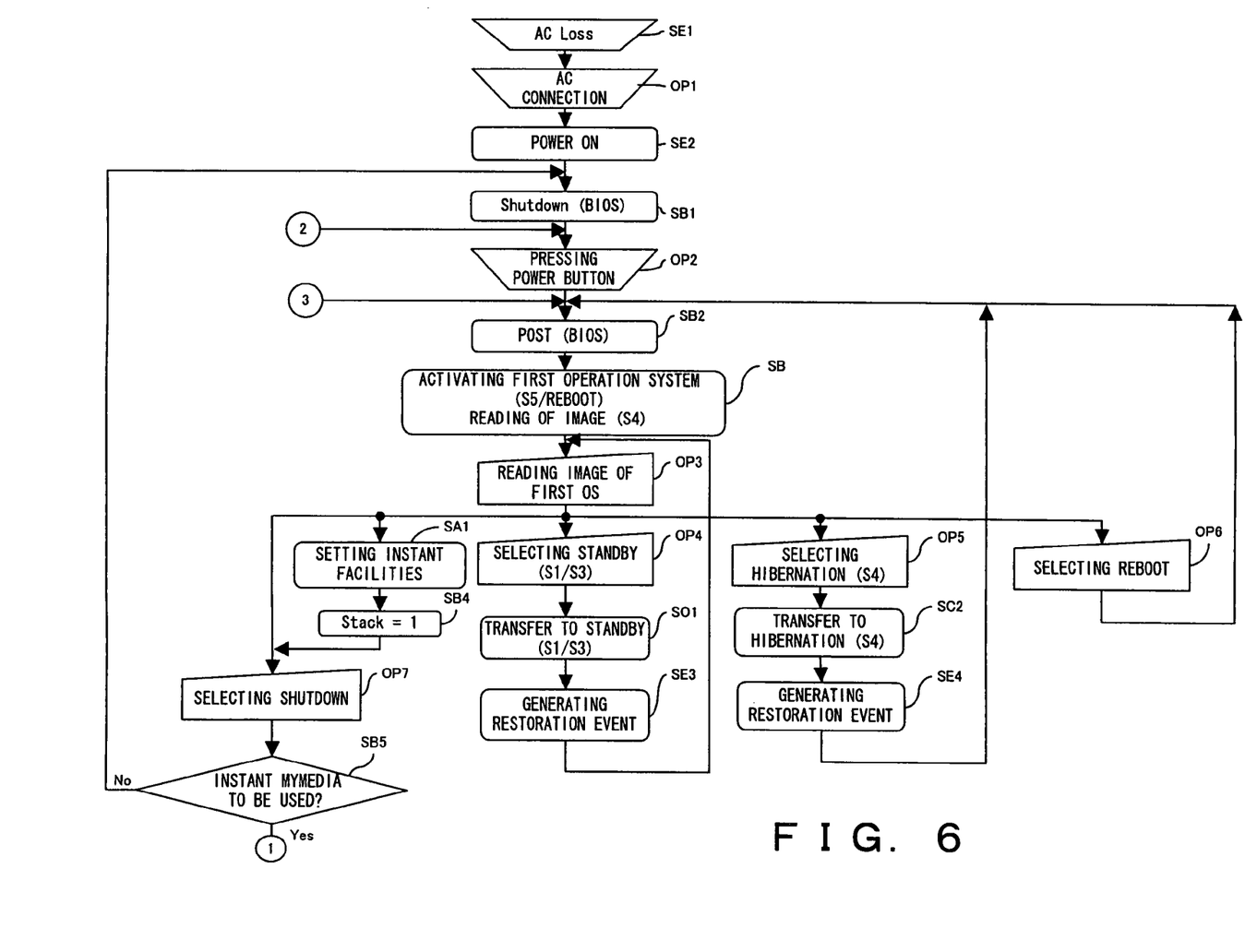
FIG. 6 is a flowchart of the entire process.
Figure 7:
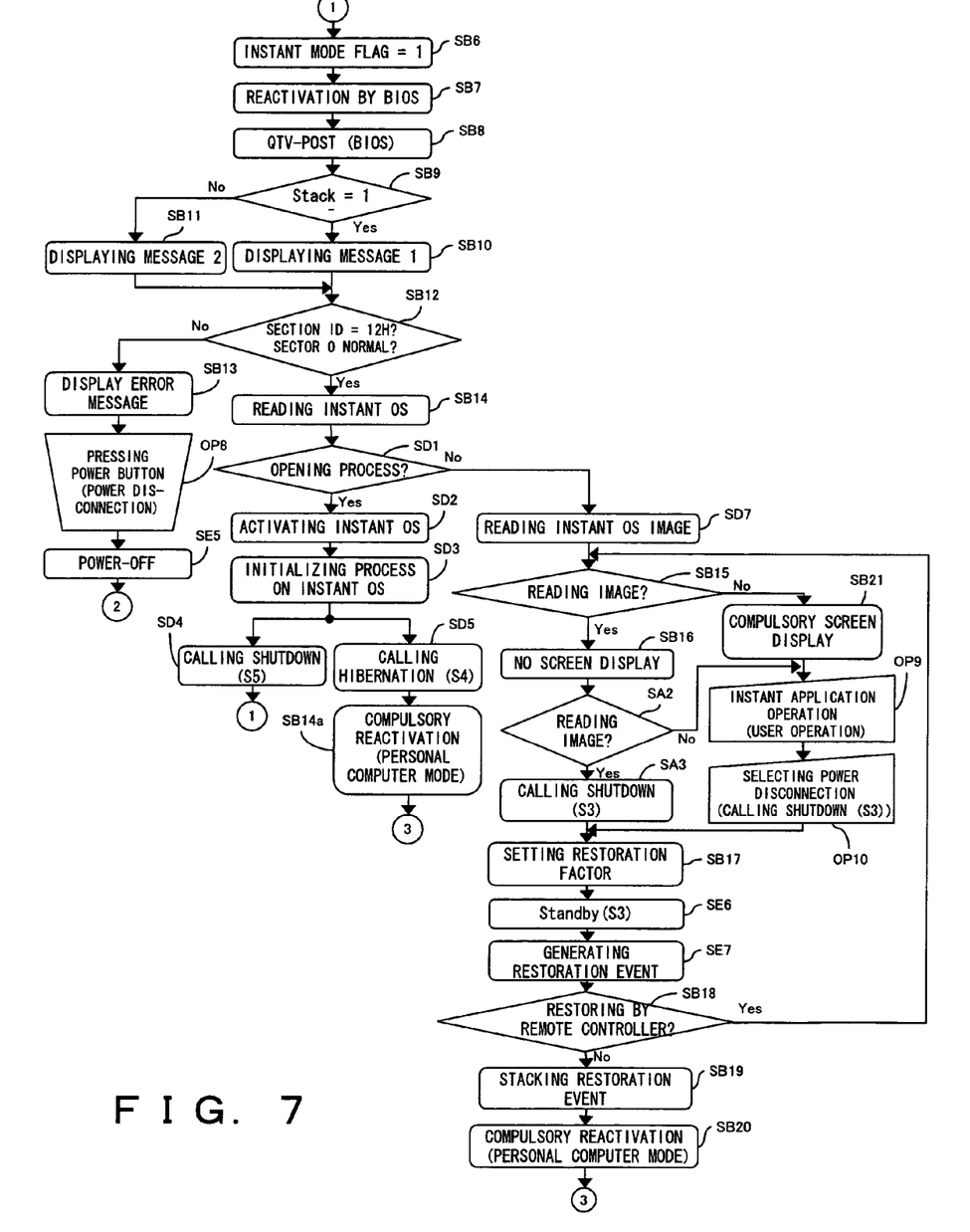
FIG. 7 is a flowchart of the entire process (continued)

FIGS. 6 and 7 are flowcharts of the entire process. They show the flow of the processes performed depending on the situation from the power-off state. Then, by referring to FIGS. 6 and 7, the operations of the information processing apparatus 10 are explained below in detail. A majority of the operations are realized by the CPU 11 performing at least one of the general-purpose OS, the instant OS, and an application depending on the situation while executing the BIOS stored in the ROM 13. Thus, the leading two symbols of a reference numeral depend on the control program or the state.

Step SE1 shown in FIG. 6 indicates that the power from the external power source 30 is not supplied. In the next step OP1 indicates that, in the state, the user connects the external power source 30. When the external power source 30 is connected, the power source controller 23 turns the power on (step SE2). By the power-on, the CPU 11 reads the BIOS from the ROM 13, and the shutdown subprogram is performed (step SB1). After the performance, control is passed to step OP2 which is the state corresponding to an activation event such as a press of a power button.

If an activation event occurs by a press of a power button by the user in the state, the power source controller 23 starts the supply of power to each component. Thus, control is passed to step SB2, and the CPU 11 executes the subprogram for POST (power on self test) of the BIOS, and it is tested whether or not the connected hardware normally works. In the next step SB3, the general-purpose OS (first OS) is read from the auxiliary storage device 17 and activated, and the image for screen display is read from the auxiliary storage device 17.

In the subsequent step OP3, the process corresponding to the operation on the RC 40 of the user and input device 15 is performed. If the user indicates the shutdown of the general-purpose OS in step OP3, the method of the shutdown is to be selected. If the user selects standby, the general-purpose OS executes a subprogram for the standby of the BIOS in response to the selection, and then the standby state (S1/S3) is entered (step OP3→OP4→SC1). After entering the state, by the restoration event occurring in the state in step SE3, control is returned to step SB2. In this case, in step SB3 after step SB2, a process is performed to return from the standby state to the original state.

When the user selects hibernation as a method for the shutdown, the general-purpose OS executes the subprogram for the hibernation of the BIOS in response to the selection, and then the hibernation state (S4) is entered (step OP3→OP5→SC2). After entering the state, control is returned to step SB2 by the restoration event occurring in the state in step SE4. In this case, in step SB3 after step SB2, a process is performed to restore from the hibernation state to the original state.

When the user selects reboot as a method for the shutdown, the general-purpose OS executes the subprogram for POST again in response to the selection (step OP3→OP6→SB2). Instep SB3 after the execution, the general-purpose OS is read again from the auxiliary storage device 17, and then activated.

When the user selects the end of the general-purpose OS as a method for the shutdown, the general-purpose OS selects the subprogram for the BIOS as a program to be executed in response to the selection (step OP3→OP7)

Like the general-purpose OS, the instant OS which enables instant MyMedia performing the opening process to be performed for necessary settings in advance. Since the OS requires the performance of the opening process, the opening process is simultaneously performed in the present embodiment. If the opening process has not been performed, then, after the activation of the general-purpose OS, the user is allowed to select whether or not the opening process is to be performed. When the user selects the performance, the BIOS temporarily activates the MyMedia to set the instant facilities, and i is substituted for the variable Stack for use as an argument (step OP3→SA1→SB4). Then control is passed to step OP7.

In the execution of the above-mentioned opening process, instant MyMedia becomes operable in the instant OS. Therefore, in setting the instant facilities, the default "instant MyMedia is not to be used" is changed to "instant MyMedia is to be used".

In step SB5 after step OP7, control is passed to the BIOS, and it is determined about the settings of instant facilities whether or not instant MyMedia is prohibited. If the user selects the execution of the opening process, or if the opening process has been performed, then it means the setting of "instant MyMedia is to be used". Therefore, the determination is YES, and control is passed to step SB6 shown in FIG. 7. Otherwise, that is, if the opening process has not been performed, and the user does not select the execution, then the determination is NO, control is passed to step SB1, and the subprogram for shutdown is performed.

Instep SB6 in FIG. 7, the instance mode flag which is a variable to be used as an argument is set to 1. In the next step SB7, reactivation is started. In the next step SB8, the subprogram for POST to be executed on an instant OS is executed, and it is checked whether or not the connected hardware normally works. Afterwards, control is passed to step SB9. The value of 1 set in the instant mode flag indicates that the instant OS is being operated or it is to be activated.

In step SB9, it is determined whether or not the value of the variable Stack is 1. If the value is 1, the determination is YES, the message 1 is displayed on the display device 16, and then control is passed to step SB12. Otherwise, the determination is NO, the message 2 is displayed on the display device 16 in step SB11, and then control is passed to step SB12. The message 1 can be, for example, "instant MyMedia is to be set. Wait a moment." The message 2 can be, for example, "The process on the PC is being terminated. Wait a moment until power is turned off."

In step SB12, it is determined whether or not there is an instant OS. If the instant OS is stored in the auxiliary storage device 17, the determination is YES, and control is passed to step S14. Otherwise, the determination is NO, and control is passed to step SB13.

In step SB13, since there is no instant OS to be activated, the notification as an error message is displayed on the display device 16. Afterwards, a press of the power button by the user is awaited (step OP8), the power-off state (S5) is entered, and then control is returned to step OP2. This is prepared for an activation event to occur by a press of the power button.

On the other hand, in step SB14, an instant OS is read from the auxiliary storage device 17 to the RAM 12. In the next step SD1, control is passed to the read instant OS, and it is determined whether or not the situation permits the execution of the above-mentioned opening process. If the opening process has been performed, the dedn is NO, and control is passed to step SD7. Otherwise, the determination is YES, and control is passed to step SD2.

In step SD2, an instant OS is activated. In the next step SD3, an initializing process is performed. Then, control is passed to step SD4, and the subprogram for the shutdown of the BIOS is called, and the instant OS is temporarily terminated. After the termination, control is returned to step SB6 under the control of the BIOS. Thus, when control is returned to step SB6, the determination in step SD1 is YES. Thus, the activation of the instant OS and the initializing process are performed again.

The initializing process has different contents between the first and second processes. In the first process, for example, a necessary driver is set with the connected hardware recognized. In the second process, for example, the image data for display of a screen to be displayed is generated. After performing the second initializing process, control is passed to step SD5, the subprogram for hibernation of the BIOS is called, and the generated image data, etc. is stored in the auxiliary storage device 17. Afterwards, the reactivation of the general-purpose OS is selected under the BIOS (step SB14a), and control is returned to step SB2 shown in FIG. 6.

Figure 8:
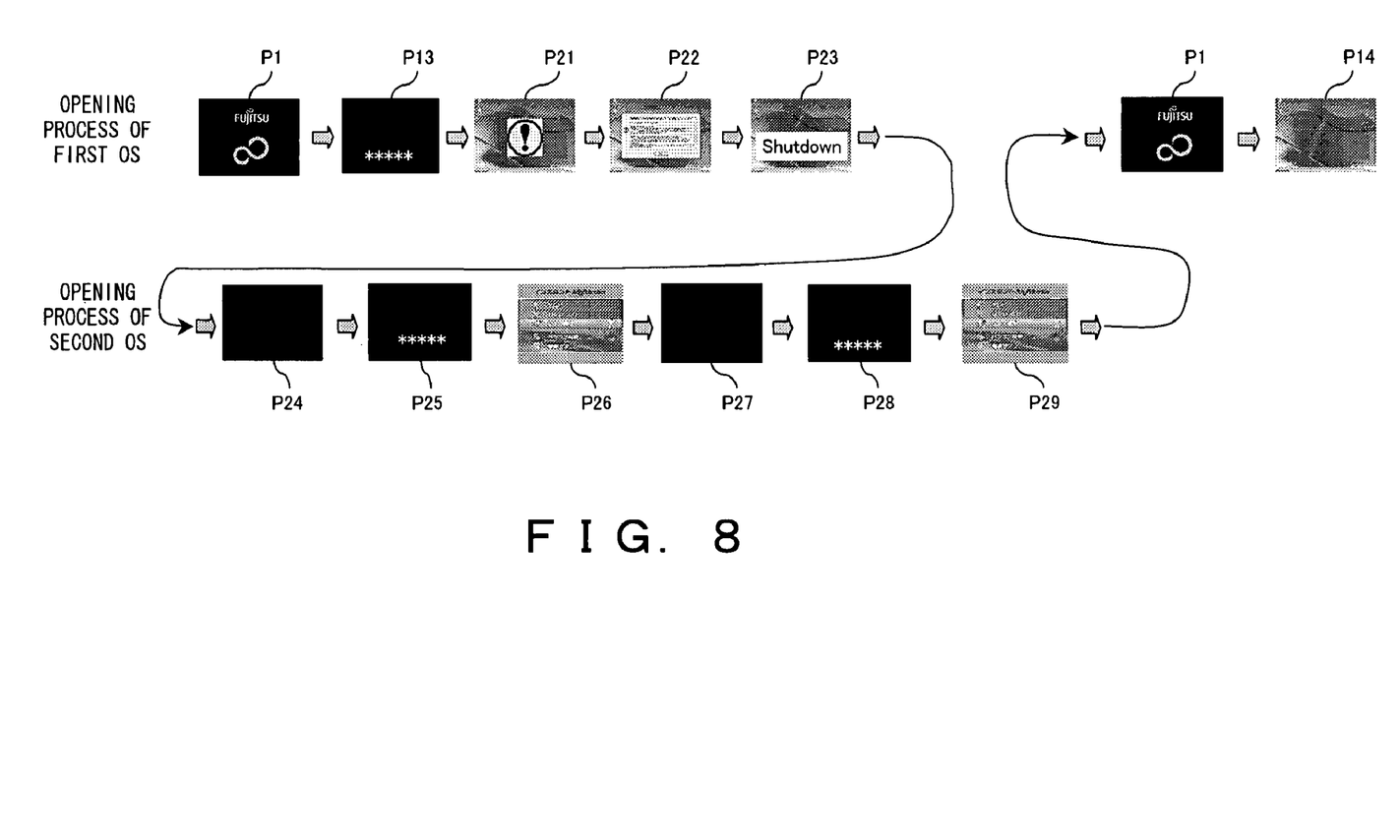
FIG. 8 is an explanatory view of the transition of the operation when the opening process is performed.

FIG. 8 is an explanatory view of the transition of an operation when the opening process is performed. Like the transition as shown in FIG. 5, the transition of an operation is represented by the transition of the screen displayed on the display device 16. The same or basically the same components as in FIG. 1A or FIG. 5 are assigned the same reference numerals.

P21 shown in FIG. 8 is a screen for use by a user to select whether or not the opening process is to be performed. P22 is a screen to be displayed when a user selects the performance, and the information to be notified is arranged on the screen P22, and allows the user to finally select whether or not the opening process is to be performed. When the user finally selects the opening process, control is passed to step SA1, The screen P23 displayed after the screen P22 notifies of the end of the general-purpose OS. After displaying the screen P23, the general-purpose OS is temporarily terminated, and an instant OS is activated.

The screen P24 id displayed when the activation of the instant OS is started. The next screen P25 is displayed when the first instant OS is activated in step SD2. The screen P26 is displayed when the instant OS is temporarily terminated by performing the process in step SD4. The screen P28 is displayed when the instant OS is activated second time in step SD2. The step screen P29 is displayed when the second initializing process is performed in step SD3. After performing the initializing process, the instant OS terminates, control is passed to step SB2, and the general-purpose OS is reactivated. Thus, the screen P1 is displayed, and then the screen P14 is displayed. Thus, when the user selects performing the opening process when the general-purpose OS is activated, the opening process of the instant OS is also performed.

The process shown in FIG. 7 is explained below.

In step SD7 in which the determination in step SD1 is NO, the image data stored in the auxiliary storage device 17 is read. In the next step SB15, control is passed to the BIOS, and it is determined whether or not the image data has been read immediately before. If the read is not performed immediately before, the determination is NO, and control is passed to step SB21. Otherwise, the determination is YES, and control is passed to step SB16.

In step SB16, not to display the screen is set. In the next step SA2, control is passed to instant MyMedia, and it is determined whether or not the image data has been read immediately before. If the read is not performed immediately before, the determination is NO, and control is passed to step OP9. Otherwise, the determination is YES, and control is passed to step SA3, and the subprogram for the standby of the BIOS is called through the instant OS. By the call, control is passed to BIOS, after a restoration event (factor) is set to restore from the standby state to the original state, and control is passed to the standby state (step SB17 →SE6). Setting the restoration event is performed by updating the data stored in the RAM 14. The determination of YES in step SA2 means that an instant OS is activated automatically in response to the termination of the general-purpose OS. Thus activated instant OS is passed to the standby state by the call of the subprogram for standby in step SA3. Therefore, by terminating the general-purpose OS, the instant OS can be automatically, constantly, and quickly activated.

If a restoration event occurs after passing to the standby state, it is determined under the control of the BIOS whether or not the event is a restoration event by the RC 40 (step SE6→SE7→SB18). Upon receipt of a notification from the infrared communication device 20 about the reception of a signal from the RC 40, the CPU 11 confirms the button operated immediately before from the infrared communication device 20 to the RC 40. Thus, if any of the buttons 43a through 43c has been operated immediately before, the determination is YES, and control is returned to step SB15. Otherwise, the determination is NO, an occurring restoration event is stacked as an activation event of the general-purpose OS (step SB19), a general-purpose OS is set as an activation target (step SB20), and control is returned to step SB2. Therefore, although in the standby state of an instant OS, the user does not perform a specific operation to activate the general-purpose OS as necessary.

In step SB21 entered after the determination in step SB15 is NO, the image data read in step SD7 is displayed on the display device 16, thereby restoring to the state in which the instant OS is activated. In the next step OP9, control is passed as necessary among the instant MyMedia, the instant OS, and the BIOS, thereby allowing the user to perform the operation on the input device 15 or the RC 40. If shutdown of the instant OS is indicated by the operation, control is passed to step OP10, and the subprogram for standby of the BIOS is called through an instant OS. By the call, control is passed to step SB17.

As described above, according to the present embodiment, if the shutdown is indicated during the operation of an instant OS, control is automatically passed to a standby state. Thus, although the shutdown of one the general-purpose OS and the instant OS is indicated, a transfer is made to a state in which an instant OS can be constantly and quickly activated.

Figure 9:
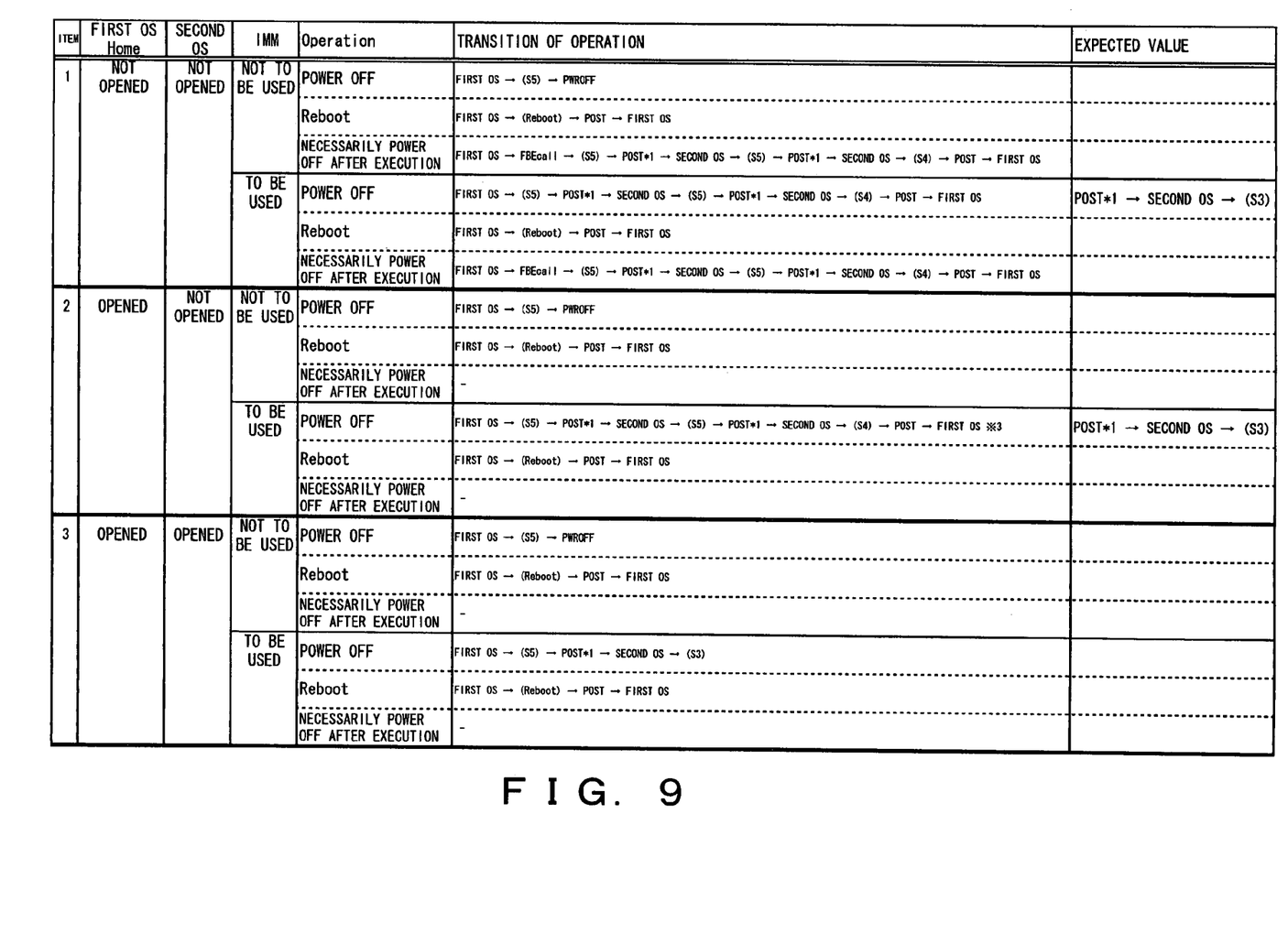
FIG. 9 is an explanatory view of the transition of the operation in an OS opening state, in setting an instant function, and the transfer of operation by a user.

FIG. 9 is an explanatory view of the transition of an operation performed by an open state of each OS, by a setting of instant facilities, and by a user operation. In FIG. 9, the settings "not to use" and "to use" in the item "IMM" respectively indicate that instant MyMedia is not used and instant MyMedia is used. The setting "necessarily turn OFF after execution" in the item "Operation" indicates that the opening process is selected by the user. The setting "FBEcall" in the item "transition of operation" indicates the setting of instant facilities performed in step SA1.

Figure 10A:
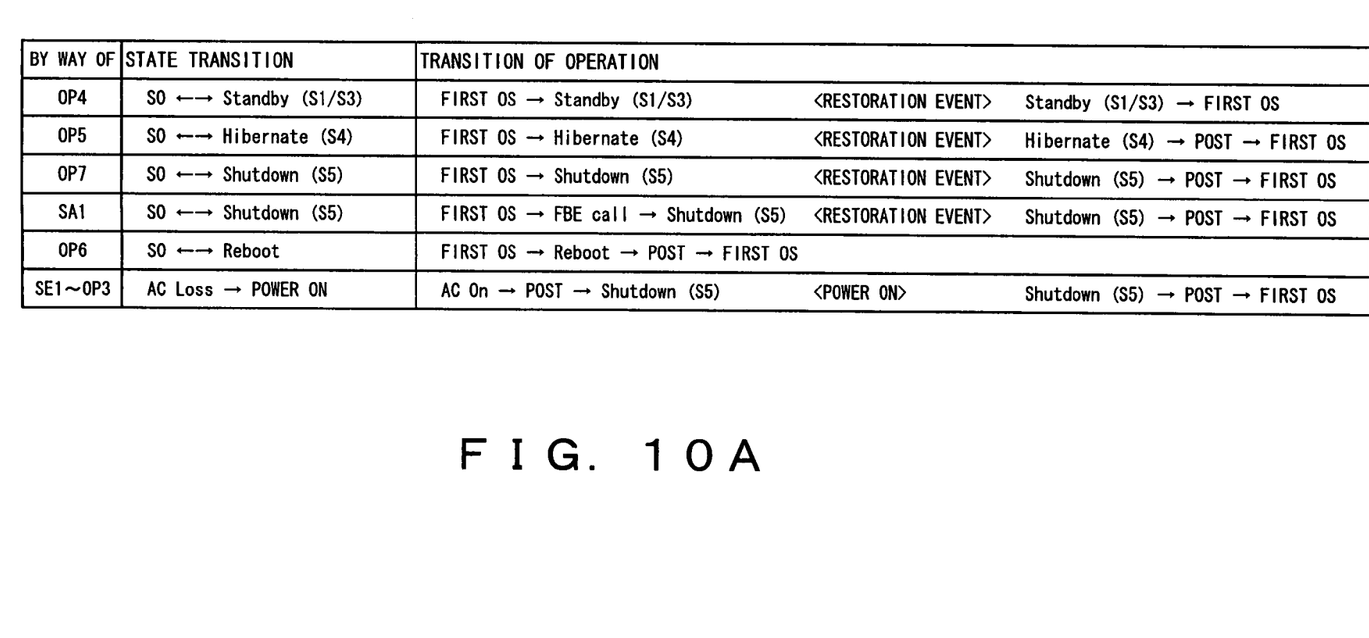
FIG. 10A is an explanatory view of a state transition and an operation transition in a state passed during the state transition (instant MyMidia is not used)
Figure 10B:
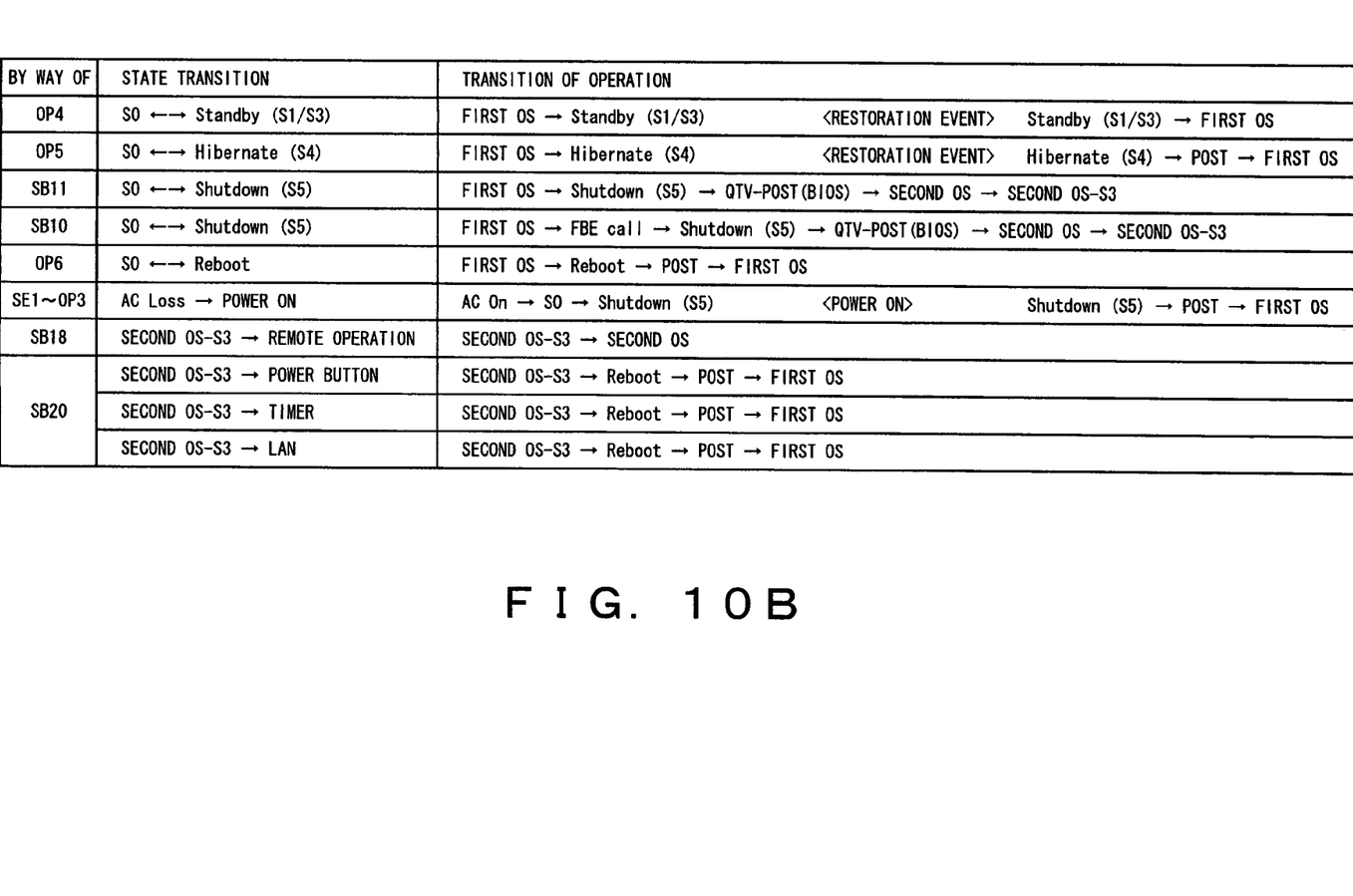
FIG. 10B is an explanatory view of a state transition and an operation transition in a state passed during the state transition (instant MyMidia is used).

FIGS. 10A and 10B is an explanatory view of the state transition and the transition of an operation in the state of the state transition. FIG. 10A shows the case in which the instant facilities are set without using the instant MyMedia, and FIG. 10B shows the case in which they are set using the instant MyMedia.

By performing the entire process shown in FIGS. 6 and 7, the transition of an operation is performed based on the situation as shown in FIGS. 9, 10A, and 10B.

In the present embodiment the activation of an instant OS by the termination of a general-purpose OS, a transfer to a standby state after the activation (including a transfer by the indication of shutdown), the restoration to the original state are realized by loading the necessary functions into the BIOS, but all or a part of the functions can be realized under the control of another program.

The present embodiment has been prepared by applying the present invention to an information processing apparatus operating only by the power supplied from the external power source 30. However, the information processing apparatus can be driven by a battery such as a notebook PC, etc. The present invention can be applied to the information processing apparatus loaded with a built-in power source such as a battery.

In the information processing apparatus loaded with a battery, for example, as shown in FIG. 2, a battery 26 is connected to the power source controller 23 so that charging the battery 26 and supplying power from the battery 26 can be controlled by the power source controller 23. In the information processing apparatus with the above-mentioned configuration, the presence/absence of the connection of the external power source 30 and the battery 26, the remainder of the battery 26, etc. can be confirmed by the power source controller 23. As a result, the instant OS activated in response to the termination of the general-purpose OS can be transferred to one of the standby state and the hibernation state. By selecting the transfer state as described above depending on the situation, the information processing apparatus can be more appropriately operated.

When the external power source 30 is connected, it is considered that the necessity to evaluate the power consumption is small. Therefore, if the external power source 30 is connected, the standby state is to be entered. If it is not connected, it is preferable to transfer to the hibernation state. The selection of the state to be entered can be performed after step SA2. The confirmation as to whether or not the external power source 30 is connected can be made with any timing before the selection.

The hibernation state entered by not connecting the external power source 30 can also be transferred to the standby state by connecting the external power source 30. If the transfer can be made by setting the connection of the external power source 30 as a restoration event in step SB17, generating the restoration event through the connection, then performing the transfer in the order of step SB18→SB15→SB21→OP9 to temporarily restore the instant OS to the operation state, and selecting the state to which transfer is made depending on the restoration event in step SOP10.

On the other hand, the standby state entered by connecting an external power source can also be transferred to the hibernation state by setting the external power source 30. The transfer to the hibernation state can be performed by disconnecting the external power source 30 and setting the remainder of the battery 26 lower than a predetermined threshold. In any case, the above-mentioned transfer method from the hibernation state to the standby state can be used.

As described above, when a transfer is made depending on the situation of the state to be entered by optionally selecting any state, the information processing apparatus can be optically operated.

What is claimed is:

1. An information processing apparatus which reads and executes a program to be executed, comprising:
   a non-volatile storage unit storing as the program a first operating system and a second operating system whose function is limited as compared with the first operating system;
   a system activation unit shutting down the first operating system in response to an instruction to shut down the first operating system being read to memory and executed, and then reading the second operating system to the memory for activation; and
   a power-saving control unit storing the data in the memory and immediately transferring the data to a power-saving state after the system activation unit activates the second operating system; wherein
   the power-saving control unit enters the power-saving state with the data in the memory stored in the memory.

2. An information processing apparatus which reads and executes a program to be executed, comprising:
   a non-volatile storage device storing as the program a first operating system and a second operating system whose function is limited as compared with the first operating system;
   a system activation unit shutting down the first operating system in response to an instruction to shut down the first operating system being read to memory and executed, and then reading the second operating system to the memory for activation; and
   a power-saving control unit storing the data in the memory and immediately transferring the data to a power-saving state after the system activation unit activates the second operating system; wherein
   when power can be supplied from an external power source and a battery, the power-saving control unit selects storage of the data in the memory from between the memory and the non-volatile storage device depending on presence/absence of the external power source, and enters the power-saving state depending on a selection result.

3. An information processing apparatus which reads and executes a program to be executed, comprising:
   a non-volatile storage device storing as the program a first operating system and a second operating system whose function is limited as compared with the first operating system;
   a system activation unit shutting down the first operating system in response to an instruction to shut down the first operating system being read to memory and executed, and then reading the second operating system to the memory for activation; and
   a power-saving control unit storing the data in the memory and immediately transferring the data to a power-saving state after the system activation unit activates the second operating system; wherein
   when power can be supplied from an external power source and a battery, the power-saving control unit selects storage of the data in the memory from between the memory and the non-volatile storage device depending on presence/absence of the external power source and a remainder of the battery, and enters the power-saving state depending on a selection result.

4. A quick activation method for allowing an information processing apparatus, in which a non-volatile storage device stores a first operating system and a second operating system whose function is limited as compared with the first operating system, to quickly activate the second operating system, comprising:

in response to an instruction to shut down the first operating system, shutting down the first operating system, and then activating the second operating system; and by the activation, saving the data stored in the memory and immediately entering a power-saving state; wherein the data stored in the memory saved in the memory.

5. A storage medium storing a program to be accessed by an information processing apparatus, in which a non-volatile storage device stores a first operating system and a second operating system whose function is limited as compared with the first operating system, the program to realize functions on the information processing apparatus, the functions comprising:

a function of, in response to an instruction to shut down the first operating system, shutting down the first operating system, and then activating the second operating system; and a function of, by activating the second operating system, holding the data stored in memory and immediately entering a power-saving state; wherein the data stored in the memory held in the memory.

6. A quick activation method for allowing an information processing apparatus, in which a non-volatile storage device stores a first operating system and a second operating system whose function is limited as compared with the first operating system, to quickly activate the second operating system, comprising:

in response to an instruction to shut down the first operating system, shutting down the first operating system, and then activating the second operating system; and by the activation, saving the data stored in the memory and immediately entering a power-saving state; wherein when power can be supplied from an external power source and a battery, selecting storage of the data in the memory from between the memory and the non-volatile storage device depending on presence/absence of the external power source, and enters the power-saving state depending on a selection result.

7. A quick activation method for allowing an information processing apparatus, in which a non-volatile storage device stores a first operating system and a second operating system whose function is limited as compared with the first operating system, to quickly activate the second operating system, comprising:

in response to an instruction to shut down the first operating system, shutting down the first operating system, and then activating the second operating system; and by the activation, saving the data stored in the memory and immediately entering a power-saving state; wherein when power can be supplied from an external power source and a battery, selecting storage of the data in the memory from between the memory and the non-volatile storage device depending on presence/absence of the external power source and a remainder of the battery, and enters the power-saving state depending on a selection result.

8. A storage medium storing a program to be accessed by an information processing apparatus, in which a non-volatile storage device stores a first operating system and a second operating system whose function is limited as compared with the first operating system, the program to realize functions on the information processing apparatus, the functions comprising:

a first function of, in response to an instruction to shut down the first operating system, shutting down the first operating system, and then activating the second operating system; and a second function of, by activating the second operating system, holding the data stored in memory and immediately entering a power-saving state; wherein when power can be supplied from an external power source and a battery, the second function selects storage of the data in the memory from between the memory and the non-volatile storage device depending on presence/absence of the external power source, and enters the power-saving state depending on a selection result.

9. A storage medium storing a program to be accessed by an information processing apparatus, in which a non-volatile storage device stores a first operating system and a second operating system whose function is limited as compared with the first operating system, the program to realize functions on the information processing apparatus, the functions comprising:

a first function of, in response to an instruction to shut down the first operating system, shutting down the first operating system, and then activating the second operating system; and a second function of, by activating the second operating system, holding the data stored in memory and immediately entering a power-saving state; wherein when power can be supplied from an external power source and a battery, the second function selects storage of the data in the memory from between the memory and the non-volatile storage device depending on presence/absence of the external power source and a remainder of the battery, and enters the power-saving state depending on a selection result.

* * * * *